3,361,015
END STRIPPING TOOL
James J. Matthews, 14 Woodcrest Road,
Hicksville, N.Y. 11801
Filed Nov. 23, 1966, Ser. No. 596,638
9 Claims. (Cl. 81—9.5)

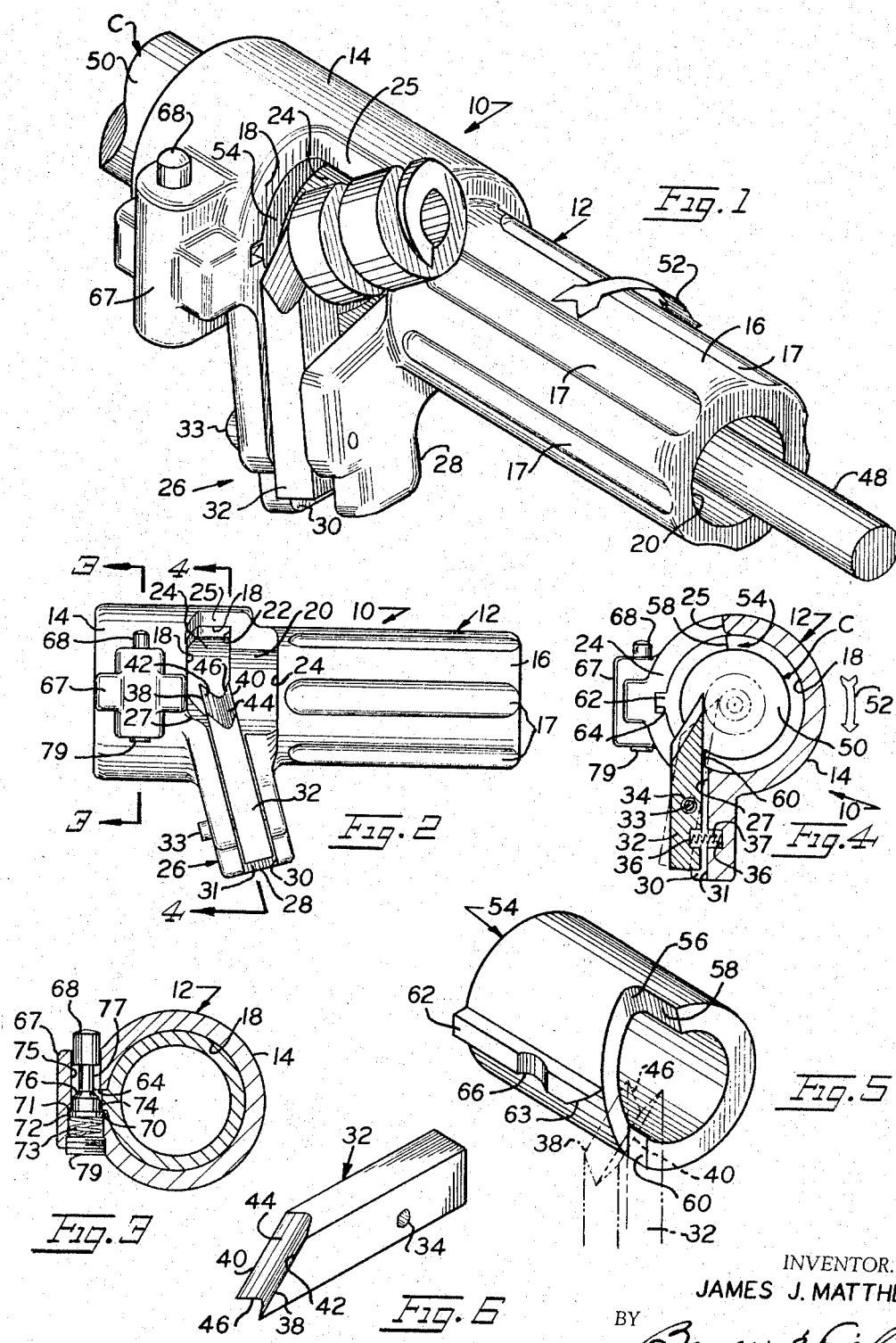
Jan. 2, 1968  J. J. MATTHEWS  3,361,015
END STRIPPING TOOL
Filed Nov. 23, 1966
INVENTOR.
JAMES J. MATTHEWS
BY Bauer & Fields
ATTORNEYS United States Patent Office 3,361,015
Patented Jan. 2, 1968

ABSTRACT OF THE DISCLOSURE

A device for removing insulation from an article by receiving the insulated article to guide the same in a bore of a body on which a cutter operates to remove the insulation which is permitted to exit from the body through an opening provided therein. An adapter is positioned in the body to locate the article for removal of the insulation.

This invention relates generally to an insulation removing tool and, more particularly, pertains to a tool for removing insulation from the end of a relatively high current carrying wire or other cable.

A device or tool for removing insulation from differently sized wires, cables and like workpieces by the use of adapters that are sized to accommodate the workpiece and to guide the same for relative movement through the device, such adapters being predeterminately positioned in the device to limit the action of a cutting blade or knife to prevent damage to the workpiece.

Many problems have been encountered in attempting to remove the insulation from wires or cables which carry relatively high currents. These problems are directly related to the fact that the insulation surrounding the conductor in such cables is relatively thick and is composed of many layers of extremely tough rubber or plastic compounds which impart desired dielectric and strength properties to the cables so that they may withstand adverse weather conditions and the like. Accordingly, standard insulation-removing techniques such as stripping the end of the wire with a knife is inefficient and tiring. Moreover, the surface of the insulation adjacent to the bared conductor and the conductor itself is left irregular or nicked, thereby producing difficulties when conductors are spliced together. For example, moisture accumulates in the interstices formed by the irregular surfaces, thereby affecting the dielectric and electrical properties of the cable.

Some tools have been provided to quickly remove the insulation from the end of a cable. However, these tools are extremely limited in their use since a different tool is required for differently sized conductors. Thus, a serviceman is required to carry about a plurality of tools so that he will be certain to have the appropriately sized tool on hand when he services cables in the field. This is not only burdensome to the serviceman but is also costly to the servicing company.

Accordingly, it is an object of the present invention to provide a single insulation stripping tool for removing the insulation from the ends of differently sized cables.

It is a further object of the present invention to provide an end stripping tool which provides the insulation adjacent the bared conductor with a flush surface to improve and facilitate splices between cables.

Another object of the present invention is to provide an end stripping tool which substantially eliminates nicking or otherwise damaging the conductor of a cable.

Another object of the present invention resides in the novel details of construction which provide an end stripping tool of the type described which is economical to manufacture and positive in action.

In furtherance of the above objects, the end stripping tool of the present invention includes a body having a through bore to receive insulated wire or cable having a first preselected diameter. Provided in the body is an opening which communicates with the bore and through which the stripped insulation is adapted to exit. A blade holder is defined in the body and it movably mounts a blade which is positioned to remove insulation from cables having a diameter equal to said first preselected diameter. When a cable is inserted into the bore and moved with respect to the blade, the blade cuts into the insulation surrounding the conductor and removes the same, thereby leaving the conductor exposed for splices and the like.

In accordance with a feature of the present invention, means are provided in the form of a bushing to reduce the diameter of the bore so that the stripping tool may be utilized to strip insulation from wires having diameters smaller than the aforementioned first preselected diameter. Additionally, the bushing is adapted to reposition or limit the depth of cut of the blade so that the blade will efficiently remove insulation from these smaller diameter cables. As a consequence, the serviceman only need carry with him a single tool which easily may be adapted to remove insulation from cables having different diameters.

A further feature of the present invention is to provide an end stripping tool which may be adapted to selectively remove the semi-conducting covering surrounding the exterior of a cable.

Other objects and advantages of the present invention will become more apparent from the following detailed description when taken in conjunction with the accompanying drawings in which:

FIG. 1 is a perspective view, to an enlarged scale, of an end stripping tool constructed according to the present invention illustrating the tool removing insulation from a cable;

FIG. 2 is a front elevational view thereof;

FIG. 3 is a sectional view of the end stripping tool taken along the line 3—3 of FIG. 2;

FIG. 4 is a sectional view of the tool taken along the line 4—4 of FIG. 2;

FIG. 5 is a perspective view, to an enlarged scale, of an adaptor for adapting the tool of the present invention to accommodate cables having small diameters; and FIG. 6 is a perspective view, to an enlarged scale, of the blade utilized in the tool of the present invention to strip insulation from an insulated conductor.

Referring now to the drawings, there is shown an end stripping tool which is designated generally by the reference numeral 10. The end stripping tool 10 includes a generally cylindrical body designated by the reference numeral 12. The body 12 includes an enlarged diameter front portion 14 and an elongated reduced diameter rear portion 16. The rear portion 16 is provided with spaced flutes 17 to provide a hand grip for the manual rotation of the tool. Provided in the body 14 is a central through bore having an enlarged diameter front portion 18 and the reduced diameter rear portion 20 which define an annular shoulder 22 at their juncture.

An opening 24 is defined in the front wall of the body 12 in communication with the bore portions 18 and 20 to provide an exit through which the stripped insulation is adapted to pass. The opening 24 is spaced from the front edge of the body 12 and extends rearwardly into the rear portion 16 of the body. The upper and lower edges 25 and 27 of the opening 24 lie on a vertical plane which passes through the center of the body 12.

Depending from and integral with the body 12 is a blade holder designated generally by the reference numeral 26. More specifically, the blade holder 26 comprises an elongated member 28 which merges smoothly with the front portion 14 of the body 12 and which extends to the opening 24. As shown in FIG. 2, the member 28 is inclined downwardly, rearwardly so that the axis of the member 28 makes an obtuse angle with respect to the axis of the portion 14 of the body 12. Defined in the member 28 is a slot 30 which is parallel to the opposite side edges of member 28 and which extends to the opening 24 in one direction and to the top edges of the member 28 in a transverse direction. Pivotally mounted within the slot 30 is an insulation removing means or blade designated generally by the reference numeral 32. The body of the blade 32 is pivotally mounted by means of a pivot pin 33 which extends through a transverse bore 34 (FIG. 6) in the blade 32. Provided in the bottom wall 31 of the slot 30 and in the bottom wall of the blade 32, adjacent the end surface thereof, are mating recesses 36 (FIG. 4) which receive the respective ends of a spring 37 which normally urges the blade 32 in a clockwise direction about the pivot pin 33, as taken in FIG. 4.

As shown more particularly in FIG. 6, the blade or insulation removing means 32 includes respective inclined sharp cutting edges 38 and 40. These edges are formed by upwardly inwardly inclined surfaces 42 and 44 that terminate in the formation of an insulation stripping or tearing edge 46. The cutting edges 38 and 40 are adapted to remove the insulation from a cable. They are directed angularly toward opposite sides of the opening 24. The blade holder 26 positions the blade 32 so that the edges 38 and 40 are directed angularly relative to the axis of body 12. Additionally, the edge 46 is angularly related to the cutting edges 38 and 40 while the surfaces 42 and 44 are directed angularly inwardly away from the opening 24.

The device thus far described is adapted to remove insulation from a cable having a first preselected diameter which is slightly smaller than the diameter of the bore portion 18 so that the cable tool 10 and its blades may be rotated and axially moved with respect to the cable positioned therein. In operation, a cable C having the aforementioned diameter is inserted into the bore portion 18 in the body 12. Thus, the cable will be substantially centrally located within the bore portion 18 by virtue of the fact that the insulation of the cable is engaged by the guiding walls defining the bore portion.

The blade 32 is normally positioned so that the cutting edges 38 and 40 and 46 are directly in the path of travel of the insulation portion of the cable. Because the blade 32 is directed at an obtuse angle to the opening 24 and, as a result of the bias of the spring 37 thereupon, as the body 12 is rotated by the repairman in the direction indicated by the arrowhead 52 (FIG. 1), the cutting edge 38 cuts axially into the insulation of the cable. The continued rotation of the body 12 relative to the cable causes the blade 32 to work its way longitudinally along the insulation in much the same manner as a follower moves along the path of a screw thread, thereby slicing the insulation from the central conductor of the cable in the shape of a spiral, as noted in greater detail below.

The points that the cutting edges 38 and 40 make with the edge 46 of the blade 32 extend across and are positioned tangentially on the central conductor of the cable so they cannot dig into the cable conductor. This is shown in broken lines in FIG. 4 wherein different diameter conductors are illustrated as concentric circles. The blade 32 is automatically located in this position by the bottom wall 31 of the slot 30 which engages the under surface of the blade adjacent the cutting edges. Thus, as the edge 38 spirally slices the insulation the tearing edge 46 of the blade is adapted to physically tear the insulation from its adherence to the control conductor.

As the tool 10 is rotated with respect to the cable to cut the insulation at the edge 38, the tool 10 actually threads itself and moves axially and spirally along the cable so that the insulation is removed in the form of a helix, as shown in FIG. 1. The removed insulation exits from the tool 10 through an opening 24 so that the insulation will not impede the movement of the cable through the tool 10 or the tool along the cable. When the desired amount of insulation has been removed from the cable, the continued axial movement of the tool 10 is stopped relative to the cable and the body 12 is then rotated in a 360° circle about the cable to provide a finishing cut. This severs the previously removed insulation from the remainder of the insulation still covering the cable to provide a substantially flush insulating end surface adjacent to the bared conductor.

In accordance with the present invention, means are provided to adapt the tool 10 so that the same may cut and remove insulation from cables having diameters substantially smaller than the diameter of the bore portion 18. Accordingly, a plurality of adaptors such as the adapter 54 shown in FIG. 5 is provided. The adapter 54 is the form of a bushing having an outer diameter which is slightly smaller than the diameter of the bore portion 18 so that the same may be received easily with the bore portion 18. Additionally, the length of the adapter 54 is substantially equal to the distance between the front edge of the portion 14 of the body 12 and the shoulder 22 so that the adapter will extend from the shoulder 22 to the front edge of the tool 10. To put this another way, the shoulder 22 limits the rearward travel of the adapter bushing 54 so that the front edges of the body 12 and the bushing are coplanar when the bushing is received within the portion 18.

The inner diameter of the adapter 54 is slightly in excess of the diameter of the cable from which the insulation is to be removed. Thus, when the adapter 54 is received within the bore portion 18, the inner wall of the adapter 54 will align the cable, so that it is coaxial with the body 12. For example, as shown in FIG. 1, the adapter 54 positions a cable C, having a diameter smaller than the aforementioned first prescribed diameter, coaxially in the tool 10. It is to be noted that the cable C includes a single central conductor 48 surrounded by layers of insulation 50. However, the present invention is also adapted to be utilized to remove insulation from a cable having a core composed of a plurality of individual conductors. It will now be obvious that if a cable having a diameter smaller than the diameter of the cable 50 is to be stripped, then an appropriate adapter, having an inner diameter which is smaller than the inner diameter of the adapter 54 will be utilized to align that particular cable so that it is coaxial with the body 12.

The rear upper surface of the adapter 54 is removed at 56 to provide a clearance for the movement of the blade 32. As shown in FIG. 5, the surface 58 is slightly longer than the flat surface 60 of the portion 56 so that the removed portion forms an extension of the obtuse angle that the blade 32 makes with respect to the axis of the body 12. Because of the smaller diameter of cable C than a cable having the first preselected diameter and the fact that the bushing adapter 54 aligns the cable C so that it is coaxial with the body 12, the central conductor 48 is brought radially closer to the cutting blade 32 than would be a cable with a smaller diameter central conductor.

If the blade 32 were permitted to take the same depth of cut with all different diameter cables whose central conductors 48 also differ in diameter, it is obvious that the blade would engage, cut into and damage the conductor 48. Thus, it is necessary to control the depth of cut the edges 38, 40 and 46 will make into the cable C. In order to limit the depth of cut of the blade in accordance with the diameter of the cable from which the insulation is to be removed and to align the cutting edge so that it is tangential to the conductor 48 to prevent damage to the central conductor 48, the surface 60 formed by the cut-away portion 56 is positioned so that it is spaced above the bottom wall 31 of the slot 30 by a predetermined distance, as shown clearly in FIG. 4.

During an insulation-removing operation, which is performed in the same manner as that indicated above with respect to larger diameter cables, the edge 38 of the blade 32 begins to cut longitudinally into the insulation 50 surrounding the central conductor 48. As the blade cuts deeper and deeper into the insulation, the bottom surface of the blade is held engaged with the surface 60 of the adapter 54 by the spring 37 which thereby limits the radial depth of cut of the blade. The distance that the surface 60 extends beyond the bottom wall 31 of the slot 30 is such as to position the tearing edge 46 of the blade so that it is tangential to the conductor 48. Thus, the insulation 50 will be removed from the cable C in the same manner and with the same ease that insulation is removed from the end of larger diameter cables.

It will be obvious that the position of the surface 60 with respect to the bottom wall 31 of the slot 30 will change in accordance with the size adapter 54 utilized. To be more specific, the relative position of the surface 60 of the adapter which extends beyond the bottom wall 31 of the slot 30 will be predetermined. Thus, the relative location of the limiting surface 60 will vary on each different adapter 54 that is utilized to guide a respectively sized cable C for movement through the tool 10. Hence, it is to be noted that the bushing or adapter 54 not only reduces the diameter of the bore 18 to accommodate respectively sized cables but also positions the blade so that it will effect a cut which always is tangential to the central conductor or conductors 48 of the wire.

Since distances between the surface 60 and the bottom wall 31 of the slot 30 are critical, complimentary formed indexing means are provided on the adapter 54 and the body 12 to locate the surface 60 with respect to the bottom wall of the slot 30. The indexing means comprises a key 62 provided on the outer surface of the adapter 54 which is adapted to be slidingly received in an appropriately located key way 64 in the bore portion 20. The key 62 and the key way 64 are located so that the surface 60 will extend beyond the bottom wall of the slot 30 by a distance proportional to the diameter of the cable from which the insulation is to be removed. In this way the indexing means 62 and 64 provides a device for quickly locating the blade limiting surface of the adapter 54. Additionally, the end of the key 62 is provided with a bevelled surface 63 for purposes which will become apparent from the description below.

Means also are provided for releasably retaining the adapter 54 in the bore portion 18. More particularly, a semicircular depression 66 is provided in the key 62. Formed integral with the body 12 is a bracket extension 67 which movably mounts a pin 68. The pin 68 has an enlarged head 70 that is adapted to be urged into abutting relation with a wall 71 of a slightly larger bore 72 by a spring 73. The pin 68 has a narrow body 74 that is guided in a through opening 75. The body 74 is tapered at 76 to a narrower shank 77 that subsequently terminates in a continuation 68 that is of the same size as the body 74. A screw 79 is secured in the bore 72 to close the same. The location of the wall 71 determines the normal positioning of the taper 76 such that it and its body 74 block the path of the key way 64. It may be moved out of the path of the key way 64 by manually depressing the exposed end of the pin 68. The body 74 is adapted to be received in the depression 66 in the key 62 when the adapter 54 is received in the body 12 in abutting relationship to the walls defining the recess 66, to maintain the adapter in place.

In operation, when it is desired to strip insulation from the end of a cable C having a diameter substantially smaller than the diameter of the bore portion 18, an appropriate adapter 54 is selected which has an internal diameter slightly in excess of the diameter of the particular cable. The key 62 is aligned with the key way 64 and the adapter 54 is inserted into the bore portion 18. As the adapter 54 is moved rearwardly the bevelled surface 63 of the key 62 engages the tapered portion of the body 74. The continued movement of the adapter 54 causes the taper 76 to ride on the surface 63 (which acts as a cam surface) thereby to move the body 74, as taken in FIG. 3, and out of the key way 64. Hence, the key way 64 will no longer be blocked by the body 74 and the key 62 will freely slide in the key way.

The adapter 54 is moved rearwardly until the rear edge of the adapter engages the shoulder 22 defined between the bore portions 18 and 20. At this point the recess 66 is automatically aligned with the body 74. When this alignment occurs the spring 73 biases the pin 68 back to its normal position in which the body 74 is engaged in the recess 66 thereby to maintain the adapter 54 in position. Additionally, the surface 60 will be positioned with respect to the lower edge of the blade 32 to locate the cutting edges in a plane which is tangential to the central conductor 48 in cable C. To facilitate positioning of the adapter 54 in the bore 18, the blade 32 may be pivoted in a clockwise direction about the pivot 33 so that the cutting edges of the blade are positioned above the surface 60. Hence, the blade will not impede the travel of the adapter to its operative position. After the adapter has been positioned, the blade may be released so that the undersurface of the forward edge thereof is biased into engagement with the surface 60.

The body 12 is then rotated in the direction of the arrowhead 52 with respect to the cable C while the cable is held stationary, or vice versa. Accordingly, the blade 32 moves axially along, cutting and removing insulation from the cable C in the manner noted above so that only the conductor 48 passes through and emerges from the rear end of the tool 10 as shown in FIG. 1. When a sufficient amount of insulation has been removed from the cable, the axial movement of the cable is stopped and a finishing 360° cut is executed which leaves a substantially smooth face on the insulation adjacent to the bared conductor 48.

When it is desired to remove insulation from a differently sized cable, the pin 68 is again depressed and the present adapter 54 is removed and a new adapter 54, which will accommodate the new cable, is inserted into the bore position 18. The insulation-removing operation is then performed again.

Accordingly, an end stripping tool has been provided which is simple in construction and easy to use and which may be utilized to strip insulation from a plurality of differently sized cables without necessitating a completely different tool for each cable.

While a preferred embodiment of the present invention has been shown and described herein, it will be obvious that numerous omissions, changes and additions may be made in such embodiment without departing from the spirit and scope of the present invention.

What is claimed is:
1. A device for removing insulation from the end of an insulated wire comprising a body,
   a through bore in said body adapted to receive an insulated wire therethrough having a first preselected diameter,
   an opening in said body communicating with said through bore to provide an exit for the insulation removed from a wire,
   a blade holder on said body positioned adjacent to said opening for supporting and positioning a blade to remove insulation from a wire having said first preselected diameter,
   a blade movably secured to said blade holder and extending beyond said blade holder into said opening and into the path of an insulated wire received in said bore,
   whereby relative movement between said body and the wire causes said blade to remove insulation from said wire,
   and adapter means sized to be positioned in said bore for decreasing the diameter of said bore to locate wires having a second preselected diameter smaller than said first preselected diameter in a predetermined position and including means for locating said blade in a plane tangential to the wire conductor in which said adapter means for locating said blade is a limiting surface adapted to engage said blade to limit the depth of cut of said blade, and indexing means between said adapter means and said body for positioning said limiting surface with respect to said blade to permit the desired cut of said blade.

2. A device according to claim 1, in which said bore is provided with means for limiting the rearward travel of said adapter means.

3. A device in accordance with claim 1, and retaining means between said adapter means and said body for releasably retaining said adapter means in said bore.

4. A device as in claim 3, in which said retaining means includes a depression on said adapter means, and a complementary formed extension on said body movable into and out of said depression, whereby said extension is adapted to engage the walls defining said depression to limit axial movement of said adapter means.

5. A device according to claim 1, in which said indexing means includes a key on said adapter means, and a keyway defined in said body to receive said key therein.

6. A device in accordance with claim 1, and mounting means for movably mounting said blade on said blade holder, said mounting means comprising a pivot pin extending through an appropriate aperture in said blade, and biasing means for biasing said blade into cutting engagement with the insulation of a cable.

7. A device for removing insulation from the end of insulated cables having different diameters and central conductors, said device comprising a body, a through bore in said body adapted to receive an insulated cable having a first preselected diameter, a knife holder, a knife having a cutting edge, mounting means for movably mounting said knife on said knife holder so that said cutting edge extends into the path of an insulated cable having said first preselected diameter whereby relative rotation between said body and a cable causes said blade to remove insulation from the cable, exit means defined in said body for providing an exit for the insulation removed from the cable, and adapter means received in said bore for decreasing the diameter of said bore and having an opening to receive a cable therein having a second preselected diameter smaller than the said first preselected diameter, said adapter means having means for positioning said cutting edge in a plane tangential to the conductor of a cable having said second preselected diameter.

8. A device as in claim 7, indexing means on said body, and indexing means on said adapter cooperable with said body indexing means to locate said positioning means of said adapter means to position said cutting edge of said knife in said plane.

9. In a device for removing insulation from a cable in which the device includes a body having a bore obstructed by a movable cutter means and wherein the improvement comprises, an adapter insertable into said bore of said body and having an opening therein to receive a cable having a predetermined diameter and to guide the same for relative movement through said bore of said body, said adapter having limiting means thereon cooperable with said cutter means to limit the depth of the cutting movement thereof, said body and adapter each having means cooperable when said adapter is inserted into said body to predeterminately position said limiting means whereby the same limits the cutting movement of said cutting means, and means on said body and adapter to releasably connect the same together for movement relative to a cable receive therein.

References Cited

UNITED STATES PATENTS

| 1,725,114 | 8/1929 | Van Gelderen | 81—9.5 |
| 2,120,398 | 6/1938 | Edwards et al. | 81—9.5 X |
| 2,493,941 | 1/1950 | Belden | 30—90.2 |
| 2,897,702 | 8/1959 | Chiglia | 81—9.5 |
| 3,204,495 | 9/1965 | Matthews | 81—9.5 |

FOREIGN PATENTS

| 529,066 | 11/1940 | Great Britain. |
| 976,132 | 11/1964 | Great Britain. |

MILTON S. MEHR, *Primary Examiner.*